United States Patent [19]

Lippman et al.

[11] Patent Number: 5,262,856
[45] Date of Patent: Nov. 16, 1993

[54] VIDEO IMAGE COMPOSITING TECHNIQUES

[75] Inventors: Andrew B. Lippman, Salem; Walter R. Bender, Auburndale, both of Mass.; Patrick G. McLean, Paris, France

[73] Assignee: Massachusetts Institute of Technology, Cambridge, Mass.

[21] Appl. No.: 893,454

[22] Filed: Jun. 4, 1992

[51] Int. Cl.⁵ .......................... H04N 7/12; H04N 7/04
[52] U.S. Cl. ...................................... 358/136; 358/141
[58] Field of Search ................ 358/133, 136, 141, 105, 358/183, 22, 87, 12, 135, 140, 11

[56] References Cited

U.S. PATENT DOCUMENTS

| | | | |
|---|---|---|---|
| 4,876,597 | 10/1989 | Roy et al. | 358/141 |
| 4,943,856 | 7/1990 | Bakhmutsky et al. | 358/141 |
| 4,969,039 | 11/1990 | Koga et al. | 358/136 X |
| 4,991,009 | 2/1991 | Suzuki et al. | 358/135 |

FOREIGN PATENT DOCUMENTS 2-036636 2/1990 Japan ................................ 358/136

OTHER PUBLICATIONS

Matsui, Kazuyuki, "High Speed Transmission of Sequential Freeze-Pictures by Extracting Changed Area", IEEE Transactions on Communications, vol. COM-29, No. 12, (Dec. 1981), pp. 1977-1981.
"An Automatic Shot-Change Detector for Telecine", J. R. Sanders, M. Weston, *BBC Engineering* May, 1974.
"Amorphous Image Processing", Steven Yelick, Submitted to the Department of Electrical Engineering and Computer Science May 9, 1980.

*Primary Examiner*—James J. Groody
*Assistant Examiner*—Safet Metjahic
*Attorney, Agent, or Firm*—Robert F. O'Connell

[57] ABSTRACT

A method of processing video data created for display in one aspect ratio in a plurality of different sequences of frames thereof, each frame in a sequence containing background data which represents at least a part of the same relatively stationary background data in the sequence. The background data in each frame of a sequence is stored and processed so as to produce combined background data representing the background image in the sequence in a different aspect ratio, without the presence of moving objects therein. Data representing moving objects in each frame of a sequence are stored together with selected portions of the background data which surround the moving objects in each frame. The data representing moving objects in each frame are correctly positioned in the combined background data, which is used for each frame of the sequence, by matching the selected portion of the background data surrounding the moving objects with corresponding portions of the combined background data to determine the correct positions of the moving objects in the background image. The background data and the matching portions of the moving objects are composited in accordance with such correct position determination to form a composite image for each frame in which the moving objects are correctly positioned in the combined background image.

14 Claims, 8 Drawing Sheets

FRAME WITH CUTOUT ERRORS

EXAMINATION WINDOW
SHOWN OVER ERRORS

CORRECTED FRAME

VIDEO IMAGE COMPOSITING TECHNIQUES

INTRODUCTION

This invention relates generally to the handling of video image data and, more particularly, to the compositing of said video-image data for converting the video image data from a form used for a picture display having one aspect ratio to a form used for a picture display having a different aspect ratio, e.g., a wider aspect ratio, and to techniques for the generation of compressed data encoding therefor which compressed encoding thereof is useful for such purpose, as well as for other video display purposes.

BACKGROUND OF THE INVENTION

Great interest has been generated in the development and use of high definition television (HDTV) systems and the commercial availability of such systems is expected to be widespread throughout the world. In such systems, the aspect ratio (i.e., the ratio of the width of a displayed picture to its height) is greater than that used in conventional, and currently available, non-HDTV television display systems, which latter systems normally provide a display having a 4:3 ratio. It is believed that the use of a video display screen design produces a more cinematic picture presentation to the viewer, such presentation being considered an important advantage in generating interest in potential customers for the wider HDTV display systems.

In order to create a wider screen effect, it has been suggested that an original narrower television image be mapped on to a wider aspect ratio screen in a manner such that the picture that is displayed is "cropped" or deleted at the top and bottom thereof and the central portion will then fit the width of the HDTV display screen. Such a technique, however, eliminates a significant portion of the image and important details thereof would often be deleted.

An inverse problem also arises wherein it is desired to show, on a conventional narrower screen system, an image obtained from a wide screen image source, e.g., a wide screen motion picture film. One approach is to map the wide screen data in its entirety to the small screen format, leaving blank the top and bottom portions of the display screen at each frame, while displaying the entire image across the screen. Such an approach where only a part of the display is used is normally not acceptable to users. Another approach is to use a "pan and scan" technique to select only one region of the total picture area in each frame as being the area of interest and displaying only that portion with a conventional aspect ratio to fill the screen therewith. The original film frames are scanned by an aperture which is narrower than the entire width, the aperture being panned as appropriate to follow the action of interest in each frame. While the entire screen is filled, the complete action or critical image content at the edges of the frame is lost to the viewer.

It is desirable to devise a better technique for handling an image originally made for presentation in one aspect ratio, e.g., a standard 4:3 ratio, so as to convert such image for presentation in a different aspect ratio, e.g., a wide screen HDTV ratio (generally 5:3 or 16:9).

BRIEF SUMMARY OF THE INVENTION

In accordance with the invention, a data processing system is used to synthesize the edges of an image and using such synthesized edges to re-create the image as if it had been generated for presentation in a wide screen form. Thus, a series of segments from a series of image frames of the original material is stored for subsequent processing by the data processing system. In presenting a series of images, as originally generated, in a background scene, e.g., on a particular set, different parts of the overall background scene or set are presented at different times (frames) in the sequence, the overall background scene not normally being displayed in any single frame, or short series of frames. Different portions of the overall background scene, however, are normally used over a relatively large number of frames and such portions are appropriately stored. Such different background portions are sufficient, when suitably composited, to create an image of the entire space representing the overall background scene. Corresponding portions that overlap from one scene to another are correlated and overlaid. When such portions are composited, they can be used to create a wider image which represents the entire background scene used in the sequence.

In performing such compositing operation, movable objects, e.g., actors, are initially deleted from the stored sequence of frames. One technique for doing so is to use a relatively large number of frames the contents of which are averaged over time. The movable objects are thereby treated, in effect, as "noise" so that, if the "averaging" process is performed over a long enough time sequence of frames, the moving object images tend to fade and, in effect, disappear from the averaged result. The overall background scene is thereby stored without an moving objects therein.

Original images of the moving objects that have been deleted in the above process are simultaneously stored so that such moving images can subsequently be re-displayed, i.e., re-inserted, into the wider screen background scene that has been created without the moving images. By storing images of each moving object together with a selected amount of the background image data which externally surrounds the image (i.e., a background "halo"), the external background data surrounding the stored moving object can then be used to match corresponding portions of the wide screen background image so that the object can be re-inserted into the wide screen background scene at the correct position to recreate the original scene in the wider screen presentation thereof. In effect, similar regions of the background as contained in the recreated background image and as also contained in the external data surrounding the stored image of the moving object are matched (i.e., a "background to background" match is provided). Since the visual focus of the viewer is normally primarily on the moving object, e.g., an actor, any small errors in matching such background regions are effectively masked since they tend not to be noticed by the viewer.

An advantage is achieved in encoding such stored images for subsequent transmission from storage to a receiver for use in any screen display. Encoding the stored data representing the overall background scene (without moving objects) compresses the results. Once the wide screen background image is created, it need only be transmitted once for decoding at the receiver, since it is used for a large number of successive frames, i.e., until the overall background scene changes and another background screen image has to be used.

Further, in order to re-create each frame, only the data in that frame concerning the elements that have to be segregated out and stored separately, i.e., the moving objects and the associated "halo" of external surrounding background data, need be transmitted in each frame for decoding at the receiver. At the decoder, they can be re-inserted into the re-created background used at each frame. Accordingly, no storage space or channel capacity must be allocated for repeatedly communicating the stationary background image. Moreover, if additional information is needed to update the recreation of the background image, e.g., information related to fade-out or fade-in effects of the background or information related to elements that are newly presented in the background and remain as a part thereof during the course of action, parameters relating thereto can be transmitted and, once established in the background, need not be retransmitted during each subsequent frame so long as the background image remains substantially the same.

The technique of the invention can also be used to create interactive display presentations, so as to permit moving objects to be inserted in the background scenes in ways not originally presented. The segregated objects can be used to create new action by concatenating segments of activity which can then be re-assembled into a complete new series of segments in the re-created background scene. With a plurality of recreated backgrounds and a plurality of moving objects, the moving objects can be animated to provide a new story line, for example, which can be generated by placing the moving objects in the backgrounds in accordance with the a newly generated story line so that, in effect, a new overall presentation is created from synthetic parts.

DESCRIPTION OF THE INVENTION

The invention can be described in more detail with the help of the accompanying drawings wherein.

In order to understand a description of a preferred embodiment of the invention, it is helpful to discuss the principles on which the technique of the invention is based.

First of all, it should be realized that, in a program having a number of different background scenes, only a portion of each scene, i.e., a portion of the overall background information in a scene, is normally revealed in any single video frame. However, if action takes place in a particular scene, e.g., moving objects such as actors move about from one position to another in the overall scene, the entire scene is usually eventually revealed over a number of video frames, from the point of view of a single, or more than one, camera.

Secondly, the content of the video data generated throughout a scene can be classified over time into categories based on the rates of change in position thereof. That is, video data representing certain objects may have a high rate of positional change, e.g., actors who move at a relatively fast rate from one position to another on the screen; video data representing certain other objects may have an intermediate rate of change, e.g., "props" may be moved only occasionally in a scene; and video data representing certain other objects may move very slowly, or be motionless, in a scene, e.g., objects making up the background, or scenic environment, of the scene.

Thirdly, the effects of outside influences on the scene, such as the lighting of the scene, do not effectively change the scene to any noticeable degree.

Based on such principles, the goals of the technique of the invention to be described can be set.

First of all, it is desired that video data be generated to recreate a two-dimensional image of an entire slowly moving, or motionless, environment (i.e. a background scene) and, during such recreation, to change the aspect ratio of such recreated presentation by making the presentation thereof have a different aspect ratio, i.e., it can be wider or taller, than the original video frames from which the background scene has been recreated.

Secondly, it is desired that the objects that are classified by their rates of change of position in the scene be separated and objects in each classification be handled in a different manner in the recreation process.

Thirdly, it is desired that the video data which is required to update a particular scene be coded differently for such separately classified objects and the number of times such data is transmitted for the recreation process be arranged to be in proportion to the rates of change thereof. For example, video data representing slowly moving, or motionless, objects in a particular scene need be transmitted only once, video data representing objects that move occasionally in the scene need be transmitted only occasionally, and video data representing objects which move frequently in the scene need be transmitted frequently. In this connection, the technique of the invention, rather than handling only pixel elements, per se, in recreating frames, considers and handles objects as a whole, i.e., background objects, props, actors, etc, in the encoding and transmission process.

Fourthly, in the technique of the invention it is desired that a sequence of video frames of a scene be displayed in a new format, e.g. one having a wider aspect ratio, independently of the format in which the video data was originally stored.

Finally, it is desired that video data with respect to the objects as classified above be composited in a suitable order, e.g., from the slowest moving objects to the fastest moving objects, so that the objects in a particular scene are all in their desired positions in the newly formatted scene, that is, they are all in their correct locations in the scene.

The accomplishment of the above goals is discussed below in a general manner in accordance with the general steps that are performed in accordance with the invention to achieve the desired result.

Step 1

The overall sequence of video frames which make up the entire sequence thereof to be presented, e.g., an entire video program, is divided into different sequences of frames, all of the frames of a video program being separated into N separate frame sequences. Such separations can be preferably made at effective "edit" points in the overall program. The term "edit points" as normally used in the art is taken to mean those points in the overall sequence of frames at which the contents of two successive video frames are sufficiently different that the video data contained in such successive frames cannot be effectively correlated, e.g., when the scene changes from one background, such as a living room, to another background, such as a location outdoors, or when the camera which has depicted a scene has moved, or when a scene is shown from a different point of view, as from a different camera.

Identification of edit points in a program is a technique that is well understood in the art and can be performed using suitable editing equipment, such as described in the article "Automatic Shot Change Detector For Telecine" by Sanders and Weston and available from the British Broadcasting Company in their publication *BBC Engineering*, of May 1974. Use thereof permits the separation of video data in to appropriately segregated, and identifiable, groups of frame sequences, each group of frame sequences representing a particular scene where there has been essentially no camera movement and where the scene is depicted from essentially the same point of view.

Step 2

Given the availability of groups each containing a sequence of frames all taken from the same camera and at approximately the same place, i.e., where the camera either panned from side to side only and/or only changed in the focal length of the lens (i.e., zoomed), it is desired to construct a single (or as few as possible, depending on how rapidly things in the scene changed) image that is a composite of the information contained in the entire sequence of each group.

For example, if the camera did not move at all, or did not change its focal length at all, the composite image could be made by simply overlaying the image in each frame on top of the image of the previous frame, and averaging or adding the intensities (pixel values) at each point in all of the overlaid frames. The composite image which results would be no wider or taller than the format of the original frames.

If the camera slowly panned to the left, then each frame should be added/averaged with a slight shift and geometric warp applied to it. Such process is substantially similar to what is described in S. Yelick, "Anamorphic Image Processing" Thesis for Degree of Bachelor of Science in Computer Science, Department of Electrical Engineering, Massachusetts Institute of Technology, May 9, 1980, but in this case the amount of shift and warp is determined by an analysis/correlation of the picture content as discussed below, since the change in camera angle is not known, whereas in Yelick the actual angle change of the camera between shots was known and the exact shift required could be computed from such known information.

As performed in accordance with the invention a determination is made as to how much to shift each succesive frame by "aligning" the content of the frames. This is done by a blockwise comparison of the picture content, i.e., each block represents a small region containing more than one pixel, usually and preferably a square array of a plurality of pixels. Each block in one frame is compared to the same block in the preceding frame. If the contents thereof match in the comparison process (e.g., in the comparison process a match can be considered as occurring if the sum of the squared differences of each pixel in the block is below a selected threshold value) then the two blocks are assumed to represent the same image content. If this is not the case, and it often is not, then blocks composed of slightly shifted arrays of pixels are compared. If these shifted arrays match to within the same threshold, then the two images are determined to have substantially the same picture content, but slightly shifted with respect to each other, i.e., the camera may have panned.

Another effective technique to determine such shift, and a technique which seems preferable in this case, is well known to those in the image coding art as "motion estimation". The actual shift is referred to as a "motion vector" which vector describes the direction and amount of the shift that one should apply to a first frame region to most closely approximate a second frame region. Motion can be estimated by techniques of "optical flow", or by block matching as described above, or more commonly by heirarchical block matching, all of which are known as described in the text, "Digital Pictures" by A. N. Netravali and B. G. Haskell, Phantom Press, N.Y. and London, 1988.

The number of blocks in a frame that have shifted in the same direction relative to the same blocks in a previous frame are converted by either approximately the same amount, or in some proportion to each other (distant objects shift more from frame to frame as the camera pans, but in the same direction a proximate objects) and are counted. If the number of blocks with similar shifts represents most of the picture (greater than 50%, for example, of the picture) it can be concluded that the two frames are the same shot, but with a simple pan or zoom distinguishing between them. On the other hand if the number of correlated blocks is small (less than 50%, for example) with respect to the total number of blocks in the picture, then either a scene change has occurred, or rapidly moving elements, such as actors, are occluding enough of the background information so that the amount of shift (or the pan) cannot be reliably calculated, or the scene is too dark, too noisy, or otherwise not amenable to such processing. In this case, the calculation can be terminated and a new sequence with succeeding frames is used.

It should be noted that only in a scene when no motion is detected, e.g., in an empty set, will the blocks in a picture correlate to reveal a true pan. When there are actors or other elements within the frame that are moving, there will always be some blocks that include at least portions of these actors or other moving elements and their motion is not necessarily the same as the motion indicated by the pan. Moreover, since the picture image is divided into blocks that are sub-regions of the overall image, there will usually be blocks that contain the edge of an actor and a portion of the background information as well. These blocks will not provide a reliable motion vector, since one part of their content is moving with the background and the other part is moving with the actor.

A larger, wider frame is created by copying each frame into a larger format image. Each successive frame is copied and partially overlaid on previously copied frames until all of the frames are stored in such overlaid manner. An averaging of corresponding points in all of the frames of a scene will create a wider image. If there are no actors, or moving elements, in the set, then a wider image is created that, by virtue of the averaging, is also noise-reduced. This is because in each individual frame, while the intensity of each point is corrupted by noise, the average distortion is zero. This averaging effect is called "motion compensated noise reduction" and has occasionally been used in television production in terms of the local shift and averaging process and overlaying each aligned frame directly on all preceding frames to produce a high quality background, although such technique has not been used to create a wider image format, as is done here.

It is helpful that the background information is thus noise reduced as a byproduct of creating the wide image assembly because the human visual system is more sensitive to image areas that are slowly moving and the slowly moving, or motionless, composite image can therefore be looked at more closely.

Such a wide image can also be effectively assembled by hand, by overlaying, on a computer screen, the successive frames of a sequence, each being semi-transparently overlaid on the last. Each can be manually shifted, and scaled/warped to make a perfect match and to assemble a wide image. Alternatively, a selected slice of each can be used and each slice layed next to the other without overlay to make the wide image, with no averaging done at all.

Step 3

It is necessary then to remove from the wide background image, any images representing moving objects, particularly objects which are moving relatively frequently, such as actors. In accordance with the above, when objects move within a sequence of frames, the image of the moving object will be averaged into the wide-screen composite image.

However, in a reasonably long sequence of frames, for example, (which may amount to several seconds of an overall program), an actor will usually move around relative to the background images, or set. In some frames, a portion of the background/set will be occluded by the actor, but that same portion normally will subsequently be revealed when the actor has moved on to another position on the set.

If a moving object is occluding a particular portion of the set for less than a reasonable number of frames in a particular sequence thereof, e.g., 50% of the frames in which that piece of the set is within the camera's view, the moving object will be effectively "averaged out" in the same manner as noise is averaged out. There will be an alteration of the brightness of that region of the set, providing, in some cases, for example, a kind of "ghost like" appearance of the image at that region because, unlike noise, a moving actor does not average to a zero level.

Such ghost-like quality can be effectively eliminated by altering the averaging process in the following manner. When a block of pixel elements from a new frame is to be overlaid and averaged into the composite image, if the pixel elements differ greatly from what is already there, they can be effectively discarded and not used in forming from the composite image, for that region or block of the images. In this manner, only substantially similar blocks are counted in the average.

An appropriate technique for doing so is to keep for each block in the wide composite, all of the blocks in the original frame, all of which blocks are suitably scaled and shifted to the correctly aligned position, as discussed above. Those blocks that are similar are then averaged together to form the final composite, while those blocks that are significantly different are simply discarded since they contain occluding elements, such as moving objects, e.g., actors. A potential problem may arise if an actor occludes a portion of the set/background for too many frames, e.g. greater than 50% of the frame sequence being examined, in which case the actor will effectively be considered part of the set since he or she has not moved significantly for a relatively long time. But, as the program progresses, that actor will usually move, unless he really is part of the set and the problem normally will not arise.

Having effectively "averaged out" moving objects, a series of composite, widened images of the sets for each sequence are formed, such images being noise-reduced and representing background video information from each point of view that the camera has taken in the overall program. These background video images are substantially free of moving actors and/or other rapidly moving objects.

In the case where occasionally moving objects, such as props, are to be identified, such objects being in the class of elements that move with intermediate frequency or rates of motion, it can be assumed that the blocks which were discarded from the averaging process as described above contain portions at least of actors or props, for example. A new average region can be formed using only those previously discarded blocks if they can be lined up to form blocks containing something large enough to consider as a prop or actor, as opposed to relatively small elements in the frame that cannot be readily classified.

In averaging such blocks, if blocks that correlate well and can be included in the average by the same criteria as used in the assembly of the averaged background, the assumption can be made that a prop has been found in that particular block, or region. It can be considered as a region of the images that includes an object that has moved, or been present, on the set for an insufficient number of frames to be considered part of the background, but as present with a rate of motion that is limited enough so that it is not likely to be an actor.

Step 4

Having formed a wide background image free of moving objects and having separated and identified rapidly and occasionally moving objects in the background, it is now desired to assemble a sequence of images in which only such moving objects are represented. These images can then be overlaid onto the background image at the appropriate time and in the appropriate location to reproduce the entire program.

Blocks that were rejected from the averaging process used to create the background are identified as above. At such time it is not known whether these blocks represent actors, props, or parts of both. When these blocks are omitted from the background averaging process, a map of their location is formed in a frame that is like an original frame, but is a frame of data which does not contain image data, but contains only map data. Each such frame appears as a frame containing different blocks, where the blocks which were not included in the original background averaging process are rectangles, so that the frame represents a partially filled in checkerboard. If the threshold criteria, by which the block is either averaged in the background or is discarded from such process, is set correctly, the map would tend to appear as a block-like outline of the moving object, or portion thereof, that is included. If the threshold is set too high, there might even be some missing blocks.

Once having identified the maps of the blocks present in a frame that represent moving objects, the blocks are enlarged in size, e.g., doubled in size, to form an enlarged region at each block that has no missing blocks, or holes. This new, enlarged region can be used as an effective template map to identify and "cut out" an identical enlarged region from the original frame. Such enlarged region in the original frame represents a moving object, e.g., an actor, along with some video background date. This enlarged region is stored and transmitted separately.

A further improvement on the above technique is to re-examine the input frames with a new threshold extension that is lower than the one used to reject blocks in the background/set compositing process. This new threshold is deliberately lowered only for those blocks that were near the blocks already rejected using the previously selected threshold. This process effectively tests for the edges of moving objects, e.g., actors, based on the content of the image rather than on mere proximity to an already rejected block.

By using a blocklike shape to approximate the edge of the moving objects and by deliberately using a region of blocks larger than the moving object, which region includes both the moving object itself and the background set information adjacent thereto an image will be created and in effect cut out of the original frame. It is then possible to insure that such moving object and its adjacent background set information are formed together in one image. In other words, the moving objects are effectively and purposely imprecisely cut out from the original frame, i.e., in cutting out an actor, for example, more than the actor is cut out. The added information that is cut out surrounds the actor as a kind of halo. The adjacent information surrounding the actor which is actually background picture information is then later used to re-insert the actor into the correct place in the widened background set image that has been previously formed and is free of moving objects. The re-insertion is aided by matching the image information forming the halo with the corresponding information in the widened background set image.

In summary, in accordance with the above steps, data defining widened background/sets are stored, one for each sequence of frames where the camera did not move too much or where an edit point occurred at the beginning and end thereof. Finally, a set of frames that contain only the moving actors and props together with adjacent background information as cut out from their associated background images are stored.

The objects which are occasionally moved, e.g., props, can then be segregated from the faster or frequently moving objects, e.g., the actors, in these latter frames, by noting that the props remain relatively static within the frames, so that the same correlation process and criterion used to segregate the background information can be applied again to segregate the occasionally moving objects which in effect appear as background relative to the frequently moving objects. Accordingly, in addition to the background information, a set of frames containing infrequently moving objects and a set of frames containing frequently moving objects are stored.

These frame sets of video information can be used to achieve data compression in transmitting the video information to a receiver for use in recreating the program in a wider aspect ratio context, for example. First the entire background/set video information that has been obtained for each particular scene need be transmitted only once for each sequence of frames representing that particular scene. Video information concerning the actors or other frequently moving objects can be transmitted once per frame in each sequence thereat, and the video information concerning occasionally moving objects can be transmitted at an appropriate intermediate frame rate in each sequence. All the transmitted frames are then re-assembled at the receiver for each sequence of frames representing a particular scene in order of the slowest to the fastest object. Thus, the background image data are first used to re-create the widened background/set for each scene, then the data representing occasionally moving objects are overlaid at the correct positions identified by their associated adjacent, or surrounding, image information onto the background/set data for each scene, and finally the data representing frequently moving objects are overlaid at the correct positions identified by their associated adjacent, or surrounding, image information onto the background/set and the slower moving image data for each scene. In this manner, the overall image information for the entire program is recreated for presentation in a wider aspect ratio.

Figure 1:
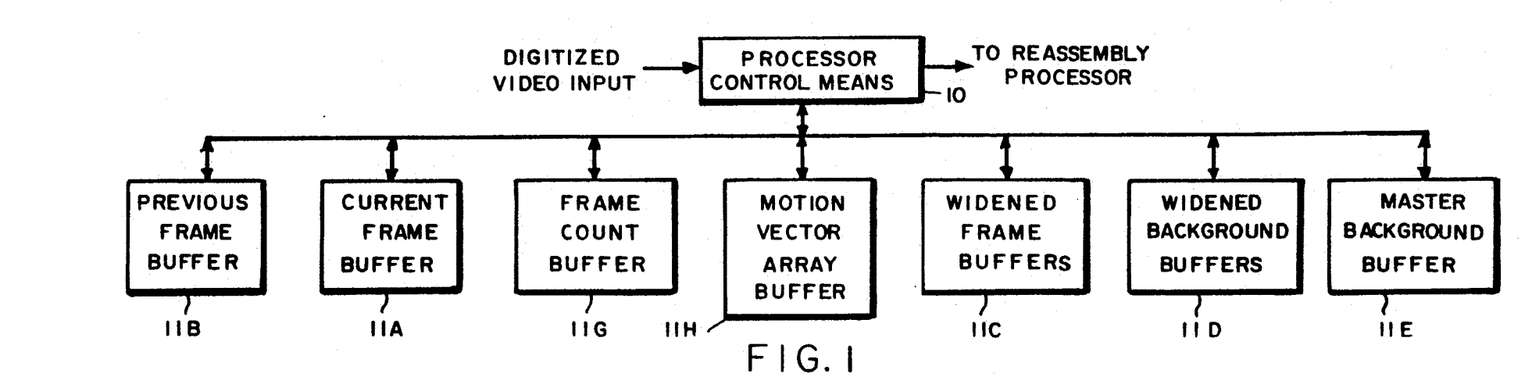
FIG. 1 shows a block diagram of a particular embodiment of a transmitter for use in accordance with the invention.

A specific implementation of system which provides the operation described above can be illustrated and discussed with respect to FIGS. 1-9. The block diagram of FIG. 1 depicts a data processing system which includes a processor control means 10 and a plurality of memory units 11 associated therewith. A digitized input signal representing a plurality of video input signal frames of a program which is to be processed in accordance with the invention is shown as being supplied to the processor control means for sequential storage of the input frames in a current frame buffer 11A and a previous frame buffer 11B for use in creating widened frame images therefrom with respect to each input frame of the program for subsequent access and processing thereof in accordance with the processing technique described with reference to FIGS. 2-7. The remaining memory elements are discussed further below.

The operations required to be performed by control processor 10 to process the input frame data can be described generally with reference to a plurality of passes through the input data, which data includes sequences of input frames, each sequence of which represents a scene of a program. In a first pass through the input frames of a sequence thereof, as described in more detail below, a motion vector field is created, using the current and previous frame buffers 11A and 11B, for each input frame of that particular scene sequence, and, in accordance with such motion vector field, the data for each corresponding input frame is moved to a corresponding one of a plurality of widened frame buffer memory elements 11C and is placed at its correct position relative to the other input frames of the same scene in the other ones of the widened buffer elements 11C. A separate widened buffer element is used for each input frame in the sequence.

It should be noted, that, since only one region of these widened buffer elements actually has image data in it, the remaining regions being blank (containing no image data), the purpose of the placing of the image data therein is to mark the offset thereof from the edge of the ultimately formed composite widened frame buffer.

Alternatively, this set of widened buffer elements 11C can physically consist of a set of narrow frame buffer elements, equal in size to the orignal narrow frames, the image data therein being used together with a coded number indicating the offset. The choice of using widened buffers having narrow images shifted from an edge and containing blank regions therein or of using narrow buffers plus a coded number representing the offset from the edge is largely a matter of implementation convenience and either approach can be used.

In the above implementations, it has been assumed that only a smooth horizontal camera panning operation occurs. If it is desired to account for horizontal camera pans accompanied by some small vertical motions or bumpiness, then all of the widened buffers are made taller to acccount for vertical offsets, or, if narrow buffers and coded numbers are used as mentioned above, then two coded numbers are needed, one for horizontal displacements and one for vertical displacements.

In a second pass through the correctly positioned frames of the widened buffers 11C, information is obtained for creating a widened master background image. This pass utilizes widened background buffer memory elements 11D which contain a plurality of input frame buffers each of which contains only data with respect to the background objects in each frame of the scene, such frames in effect representing only those portions of each input frame in widened buffers 11C which do not move, or which move only very infrequently, during the scene.

In a third pass, this time through each frame in the widened background frame buffers 11D, data representing corresponding background pixels in each frame are suitably averaged and the averaged values are placed in a single widened master background buffer 11E. The averaging process removes them from the sequence of frames in the original widened background buffers 11D. Data representing objects or portions of objects which remain in each frame of the original widened frame buffers 11C are identified as foreground objects, i.e., objects which move very frequently, or at least somewhat frequently, in the scene (e.g., moving actors or moving props). After the third pass, a single widened background image is stored in widened master background buffer 11E and a plurality, or set, of frames each of which contains only images of foreground objects therein are stored in original widened frame buffers 11C.

In a fourth pass through widened frame buffers 11C, the foreground images in widened frame buffers 11C are processed to perform certain error corrections therein. Thus, if there are relatively small isolated image regions in a widened frame, i.e., images which are completely isolated from the larger foreground objects, such isolated regions are deleted from each of the widened frames. If certain small regions within a foreground objects have been incorrectly deleted, in effect leaving a "hole" in the foreground object, such regions are filled in by re-copying the data that has been deleted by the averaging process back into these hole regions.

When the four passes are completed, a single widened master background image for the scene has been created and stored in the widened master background buffer 11E and a set of frames containing images of error corrected foreground objects only in each of the frames are stored in widened frame buffers 11C. Such background and foreground images are then ready for transmission to a receiver for re-assembly thereat into a complete set of widened frames for the scene, each frame containing a master widened background image and the foreground objects in that frame correctly positioned in the widened background image. Such re-assembly process is discussed in more detail below, following the more detailed description below of the above four pass operations, with reference to FIGS. 3-7.

The first pass proceeds by examining each of the frames of a scene in sequence and sequentially counting the frames as they are examined until the end, or edit point, of the scene occurs. The data needed to reconstruct that scene is then processed, as discussed below, after which the data in the frames of the next scene, as needed for reconstructing the next scene are processed, and so on through the frames of each successive scene from edit point to edit point until the end of the program.

Figure 3:
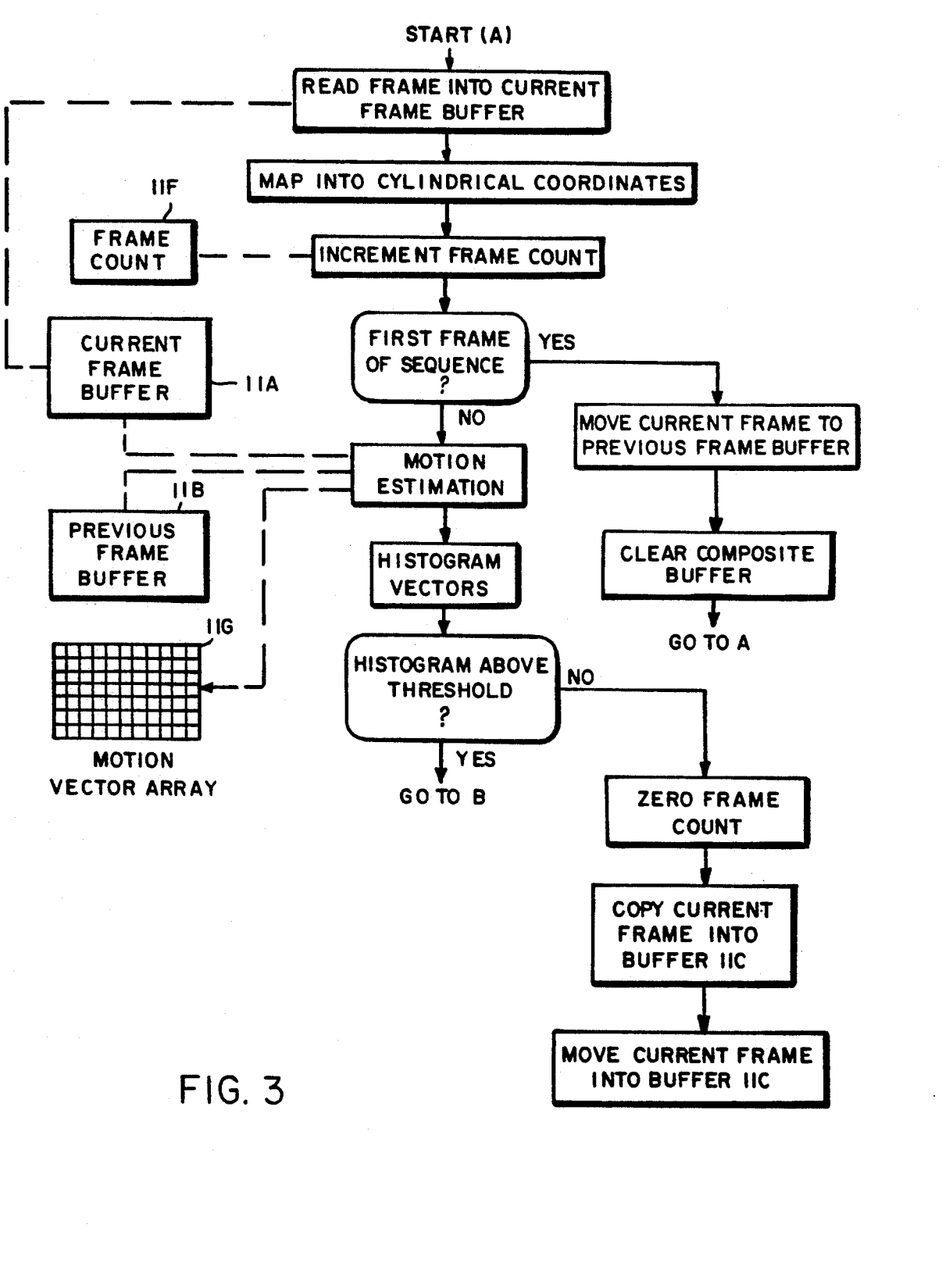
FIG. 3 shows a flow chart and various elements for depicting a portion of the operation of the invention for processing data representing a scene of a program to be reproduced in accordance with the invention.
Figures 4, 5:
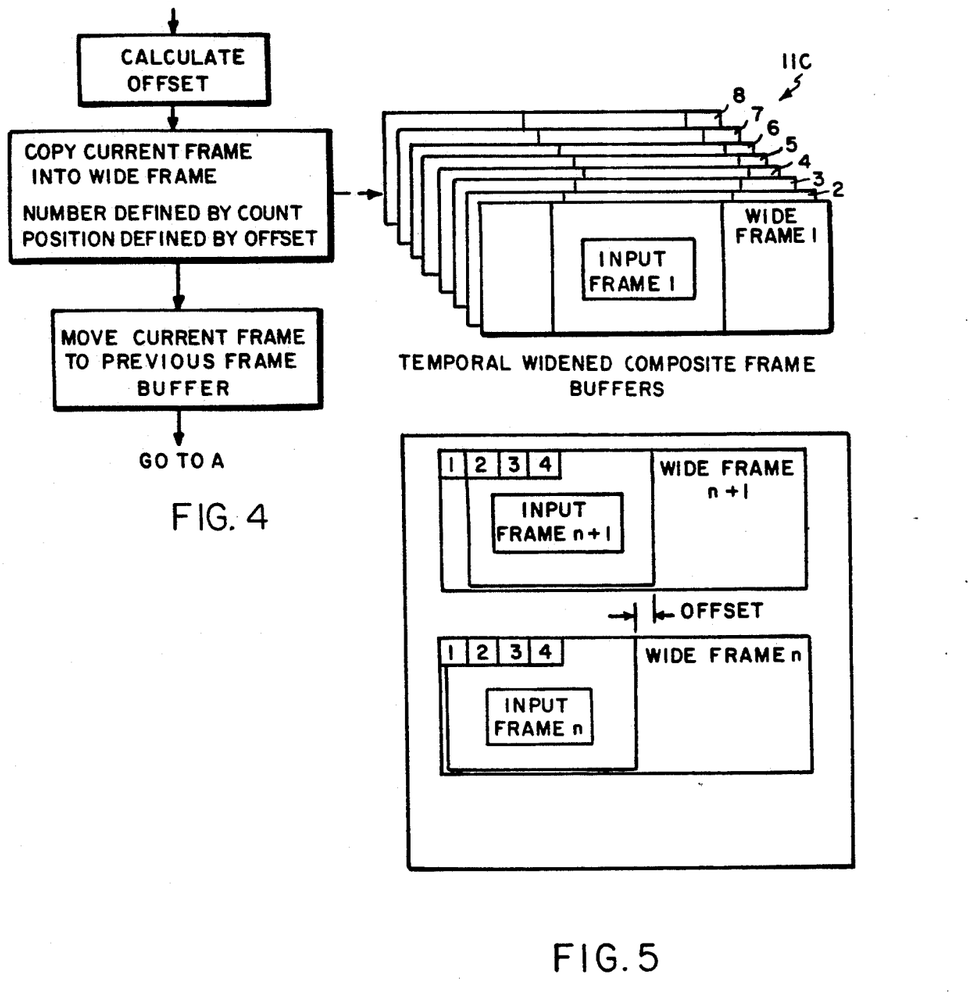
FIG. 4. shows a flow chart and a wide frame buffer for depicting a further portion of the operation of the invention.
FIG. 5 shows an illustrative pair of successive wide frame buffer elements to depict the off-sets therebetween.

In processing a particular scene, as shown in FIG. 3, a current frame buffer 11A and a previous frame buffer 11B are used together with a frame count register 11F. In the processing operation two data bases are created, one being stored in a motion vector array memory 11G and representing motion vector fields for each frame of the sequence and one being stored in temporal widened composite frame buffer elements 11C, as depicted in FIG. 4, which contains each input frame suitably shifted with respect t its previously examined adjacent frame so as to correctly position the data therein relative to the data in all other frames, there being in the buffers 11C one widened frame corresponding to each narrow input frame image.

As seen in FIG. 3, the first frame of the sequence is stored or read into the current frame buffer 11A. The data therein is suitably mapped into cylindrical coordinates from the planar coordinate data contained in the raw input frame. For clarity, this mapping operation is discussed in more detail in the Appendix hereto. The cylindrical data effectively simulates a cylindrical focal plane, as discussed in such Appendix. The frame counter in frame count buffer 11F is incremented from zero to one to indicate that the first frame of the scene sequence has been read into the current frame buffer 11A.

The first frame is immediately moved from current frame buffer 11A to a previous frame buffer 11B and the next frame of the sequence is read into the current frame buffer and the frame counter is incremented again. All subsequent frames are thus handled in sequence in the same manner.

When a current frame and a previous frame are stored in their respective buffers, a motion estimation process is performed with respect thereto. In one embodiment of such a motion estimation technique, for example, a blockwise comparison is made of a region in a current frame with nearby regions of the previous frame. That is, a suitably sized block of pixels (constituting such a region) in a current frame is compared to a plurality of similar sized blocks of pixels in the corresponding vicinity of the previous frame. The offset (i.e., data representing a vector having an offset value and an offset direction) between the block in the current frame and that block in the previous frame which most closely correlates, above a selected threshold, with the current frame block is recorded. The vector represents the amount and direction of shift of the closest correlated block of the current frame from the block of the previous frame. The offsets for all of the blocks in the current frame are similarly determined and recorded. The ensemble of offset vectors for each block are stored in a motion vector array buffer 11G.

The ensemble of vectors is tabulated (e.g., to create a histogram thereof) to determine whether there are a sufficient number having the same size and direction, above a selected threshold, to show a meaningful motion between the two frames, so that such motion can be characterized as a camera "pan" operation. If there are a sufficient number of vectors in the histogram that are approximately of such same size and direction, e.g., 50% or more of the total number of vectors, then the overall histogram is determined as being "above threshold" and a pan is thereby recognized.

As shown in FIG. 4 in that case, the offset of the current frame from the previous frame is directly calculable as the mean value of those vectors that are approximately the same size and direction, such mean vector value representing the distance that the camera has shifted the two frames with respect to each other by the panning operation. The current frame is then copied into buffer 11C at the correct frame number and at the current frame offset position therefor relative to the previous frame. If there are not a sufficient number of vectors above the threshold, the correct frame is copied into the frame buffer 11C at the current frame number without any offset from the previous frame. In each case, the current frame is then moved to the previous frame buffer 11B and the next frame of the sequence is moved into the current frame buffer from which the previous frame has been deleted.

The data representing the first frame is effectively placed in a generally centered position in the first widened frame 1 of widened composite frame buffer 11C, shown more specifically in FIG. 4. The next frame is placed in the next widened frame 2 of composite buffer 11C shifted from the first frame by the offset with respect thereto. The process continues for each subsequent frame, each current frame being compared with its previous frame to determine its offset, if any, therefrom, until all of the input frames have been so processed and placed in their correct relative positions in widened composite buffer 11C. The process terminates at the next edit point, i.e., at the end of the scene. At that stage, corresponding points in each frame in the scene are aligned "behind" each other in the set of frames stored in widened composite buffer 11C.

FIG. 5 illustrates more clearly the concept of writing current frames into the widened frames of the widened composite buffers 11C with an offset relative to previous frames. In the upper left of widened frames n and n+1 are shown similar pixels (greatly enlarged and numbered as pixels 1, 2, 3, and 4 in the examples shown). Because of the shift (offset) associated with the panning action of the camera, the region of the background image depicted by pixel "3", for example, always represents the same scene element.

When an end of scene sequence is detected, the set of widened frames in widened composite buffers 11C is processed to create both a single widened background image and a set of widened frames in which the background has bee effectively deleted leaving only the movable foreground objects in each frame, e.g., the relatively frequently movable actors, as well as the less frequently movable props.

Figure 6:
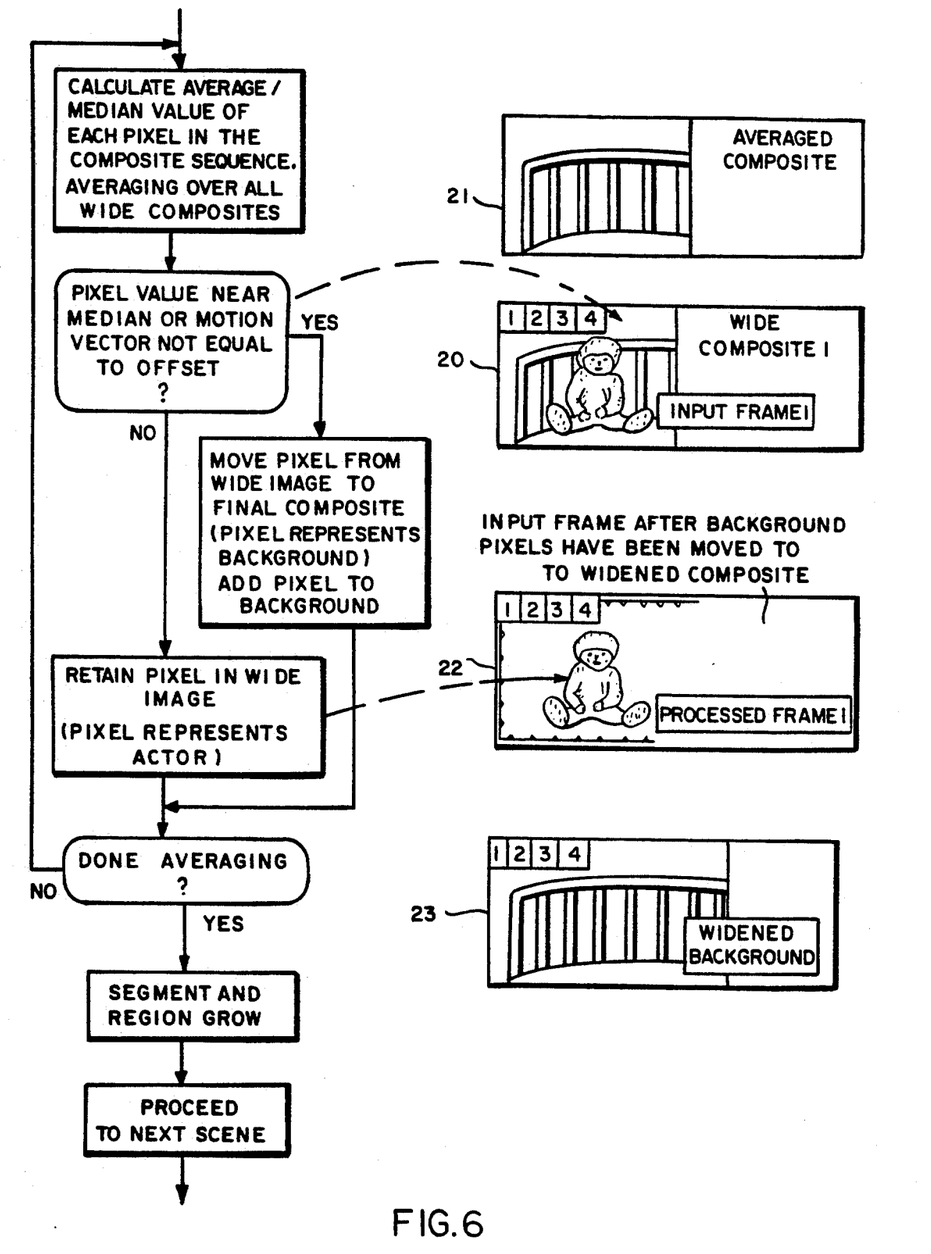
FIG. 6 shows a flow chart and associated stored images for depicting a still further portion of the operation of the invention.

In such process, as shown in FIG. 6, pixels at the same position in each successive frame in the widened composite buffers 11C are averaged together to obtain a single widened frame made up of such averaged values in buffers 11C which averaged values are stored in a widened background buffer 11D (FIG. 1). If the scene contained no movable elements, such as actors or props, so that substantially nothing in the sequence of frames representing the scene has moved, the averaged values placed in buffer 11D would represent a noise-reduced, widened scene revealing everything the camera recorded during the sequence. In fact, however, the averaged values will be corrupted by the occasional presence of a foreground moving object, e.g., an actor moving in front of the background image. The intensity of the moving object will generally be different from that of the background, thereby altering the averaged values at those regions.

In such an averaging process as shown in FIG. 6, for example, the median value for all of the corresponding pixels in the set of frames in buffers 11C is calculated. This calculation, in effect a thresholding operation, tends to eliminate corruption of the actual background intensity values by the presence of a portion of a foreground object (moving actor or prop) in the pixels being averaged, which presence, for example, occludes the background image for part of the overall duration of the sequence. The actor can then be, in effect, thresholded out by the averaging process, if the actor does not occlude the background for more than a specified percentage of the scene duration, e.g., for 50% thereof. For example, a frame 20 (e.g., input frame 1) shown in FIG. 6 has an actor and the averaging process for corresponding pixels in all of the frames of the scene will produce an averaged composite image 21 of those pixels where the actor has been thresholded out. If, for the pixels being averaged, the actor occludes the background for more than 50% of the scene duration (the actor has effectively not moved or moved very little during the sequence), the actor becomes in effect part of the background for that scene.

To determine when such a movable object is encountered in the scene, the pass depicted in FIG. 6 is made through the entire set of widened frames in the widened composite set of frame buffers 11C. During this pass, the intensity value of each point, or pixel, in each widened frame is compared to the average intensity value in the widened composite image 23 created in widened background buffer 11D above. At the same time, the motion vector for that point is compared with the offset. If the pixel intensity is substantially near the average, that pixel is considered part of the background image and is deleted from the wide frame being examined in composite buffers 11C and that pixel is left blank in that particular wide frame. If its intensity differs from the average intensity by a threshold amount, it is assumed to be a movable object (e.g., actor) and it is retained in the wide frame of the composite buffers 11C. In addition if the motion vector of that pixel is different from the offset, it is assumed that the pixel is part of a movable object and is retained in that wide frame of the composite buffers 11C. An example of the retained image is shown by processed frame 22 in FIG. 6 in which the background pixels have been moved to widened background buffer 11D (widened background 23), leaving the actor in that frame of buffers 11C (processed frame 22).

The above process continues until the corresponding pixels in each of the wide frames of the set thereof in composite buffers 11C has been processed. At the completion of this pass, the system provides a single widened composite background image in buffer 11D as shown by widened background frame 23 in FIG. 6 and a set of widened frames in composite buffer 11C each of which contains only movable foreground objects (actors and props of the type shown by exemplary processed frame 22).

Figure 7:
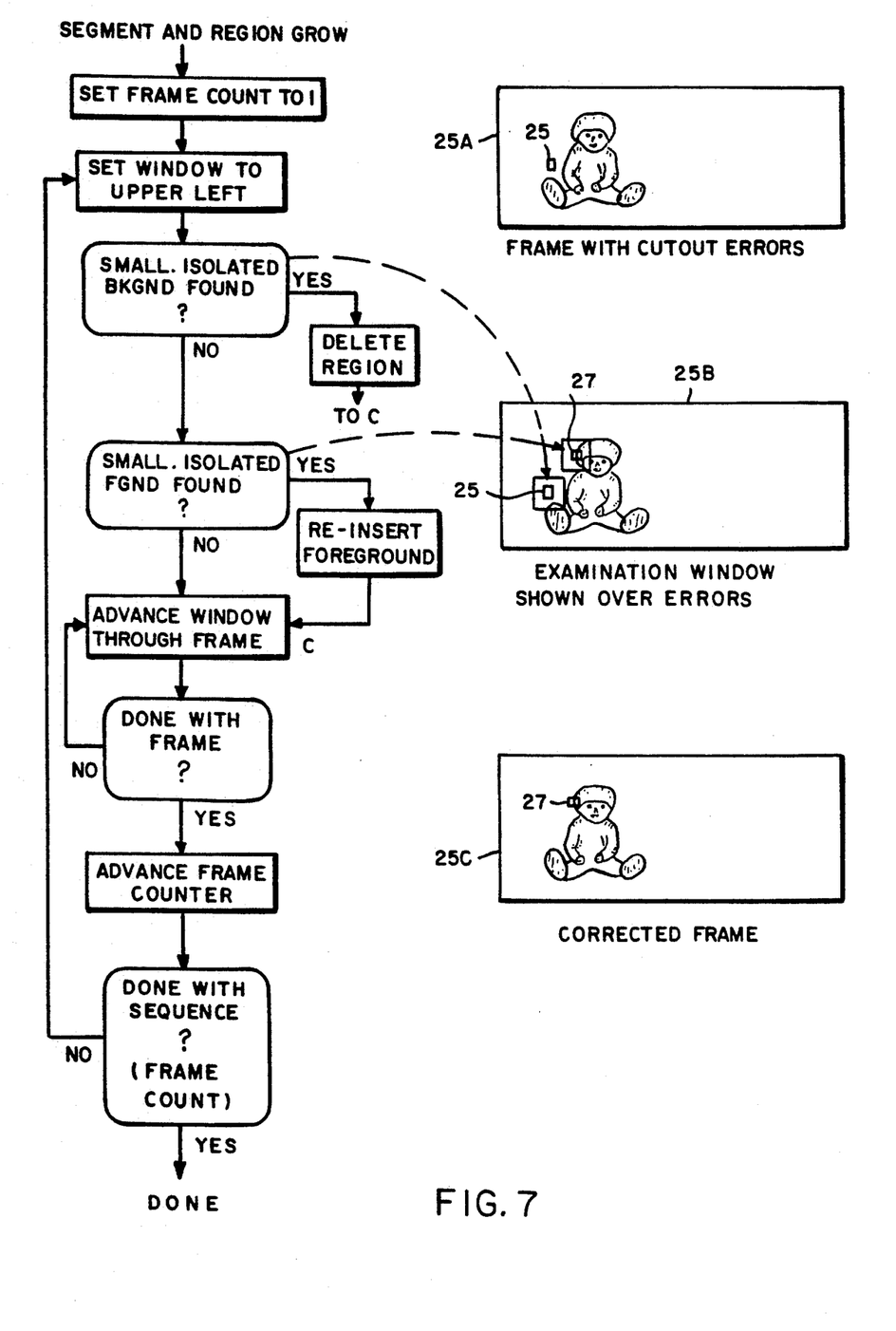
FIG. 7 shows a flow chart and associated stored images for depicting a still further portion of the operation of the invention.

During a fourth pass operation, the foreground object images in composite buffers 11C are further processed to delete isolated regions which are not parts of the movable objects that have been retained and to fill in "holes" which represent deleted pixels which occur within the retained images of the movable object. During such process, as shown in FIG. 7, each pixel of a frame (e.g., exemplary frame 25A) of widened frame buffers 11C containing one or more foreground objects is examined to determine whether it is part of a movable object or is part of a region isolated from the object. If it is found that it is part of a small isolated background region 25 (as in exemplary frame 25B), the pixel is deleted. Thus, the pixels which are part of isolated regions are all deleted so that the isolated regions are no longer retained as shown by exemplary frame 25C, in one of the frame buffers of composite widened buffers 11C.

Pixels are further examined to determine if they represent a blank 27 (zero intensity value) within a movable object, i.e., a small isolated foreground image, as shown in exemplary frame 25B, that has been retained in a frame of buffers 11C. If a blank pixel is found within a retained object image, the original frame pixel data is re-inserted at that point to fill in the "hole" or blank that was created, at the region 27, as shown in exemplary frame 25C. If a pixel does not represent either a blank within an object, or data in an isolated region, it is retained and the process continues to the next pixel of each frame, until all pixels of that frame have been so examined.

When the processing of a frame in composite buffers 11C in this manner is completed, the frame counter is advanced and the next frame is processed as shown in FIGS. 5–7, until all frames of the sequence have been so processed. At this stage, all of such imperfections are corrected, i.e., background regions which are isolated from foreground object images are deleted and blanks in foreground object images are re-inserted, and corrected foreground object images remain stored in each of the widened frames of the composite buffers 11C. The transmission of data with rspect to the single widened composite background image and with respect to each widened frame of foreground objects for reassembly at a receiver is described below.

Figure 2:
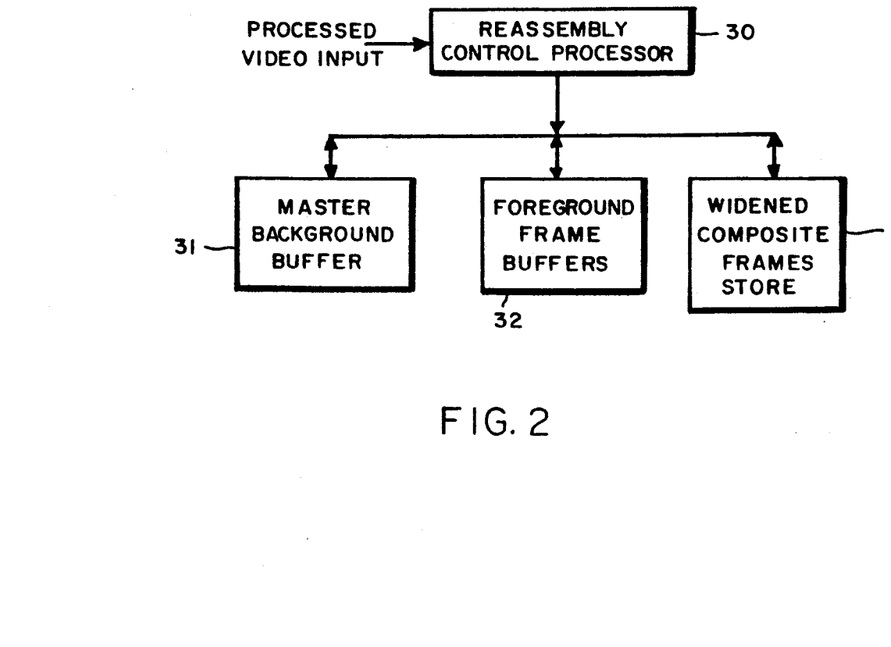
FIG. 2 shows a block diagram of a particular embodiment of a receiver for use in accordance with the invention.

For the re-assembly process, the data in the single widened background image in buffer 11D is transmitted to a receiver re-assembly system, as shown in FIG. 2, once for the particular scene being assembled. The widened frames which contain foreground objects in buffers 11C are then transmitted in sequence, to the receiver for the re-assembly process.

In the re-assembly operation, the foreground objects in each widened foreground frame are roughly positioned in the composite background image using a reproduction of the single composite background image in each case to provide a set of final widened composite frames each containing the foreground objects for that frame roughly positioned in the composite background image reproduced for that frame. More exact positioning of the foreground object in the composite background image is then accomplished by more closely matching the background data at the edges of the foreground object image with the background data in the composite background image. Such a process is illustrated for a single frame in FIG. 8 for a receiver shown in FIG. 2.

Processed video input data, in this case representing a single widened frame containing a single widened background image (originally from buffer 11E), is received at the re-assembly control processor 30 and stored in a suitable master background buffer 31 in FIG. 2. An individual frame (e.g., one of the frames of widened frame buffers 11C) containing one or more foreground objects only (with the background image deleted therefrom) is received by re-assembly control processor 30 and stored in a frame of foreground frame buffers 32.

The basic concept of the re-assembly process is that, with respect to each frame, regions of the composite background image in master background buffer 31 and generally corresponding regions at the edges of the foreground object images in each of the frames of foreground frame buffers 32 are correlated to provide a measurement which will bring them into alignment. In the correlation process, the intensity at each corresponding point (pixel) in two similar sized image blocks, one block in the background image and one block in a foreground image, are multiplied and a running sum of the products for all of the points in each block is suitably stored. The sum of the products will be at a maximum when the blocks are identical and will become lower as the blocks differ either by their intensity information contents or by virtue of their having different offsets. If this sum of the products, normalized by block size, is above a selected threshold, then the blocks are deemed to be sufficiently correlated as would be well-known to those in the art. If the blocks differ sufficiently that no correlation threshold is determined, the full correlation operation proceeds by shifting the blocks relative to each other and performing the correlation process again until two blocks are found which correlate in accordance with the selected threshold criterion.

If no appropriate correlation is found, after shifting the blocks which are in the same general region of the background image and foreground image frames, the sizes of the blocks are decreased, e.g., to half their original sizes, and the correlation process is repeated for the same general regions of the frames. By such an approach, it is ensured that the process is not attempting to correlate the background image with the foreground object itself, since the concept used herein is to correlate a background image region with a corresponding region adjacent an edge of the foreground object image. Eventually, as the correlation process continues, by successively reducing the size of the blocks by one-half, the blocks being compared will be small enough so that only a region adjacent an edge of the foreground object (an appropriate portion of the "halo" region which surrounds the foreground object) and a corresponding region of the background image will be correlated.

Figure 8:
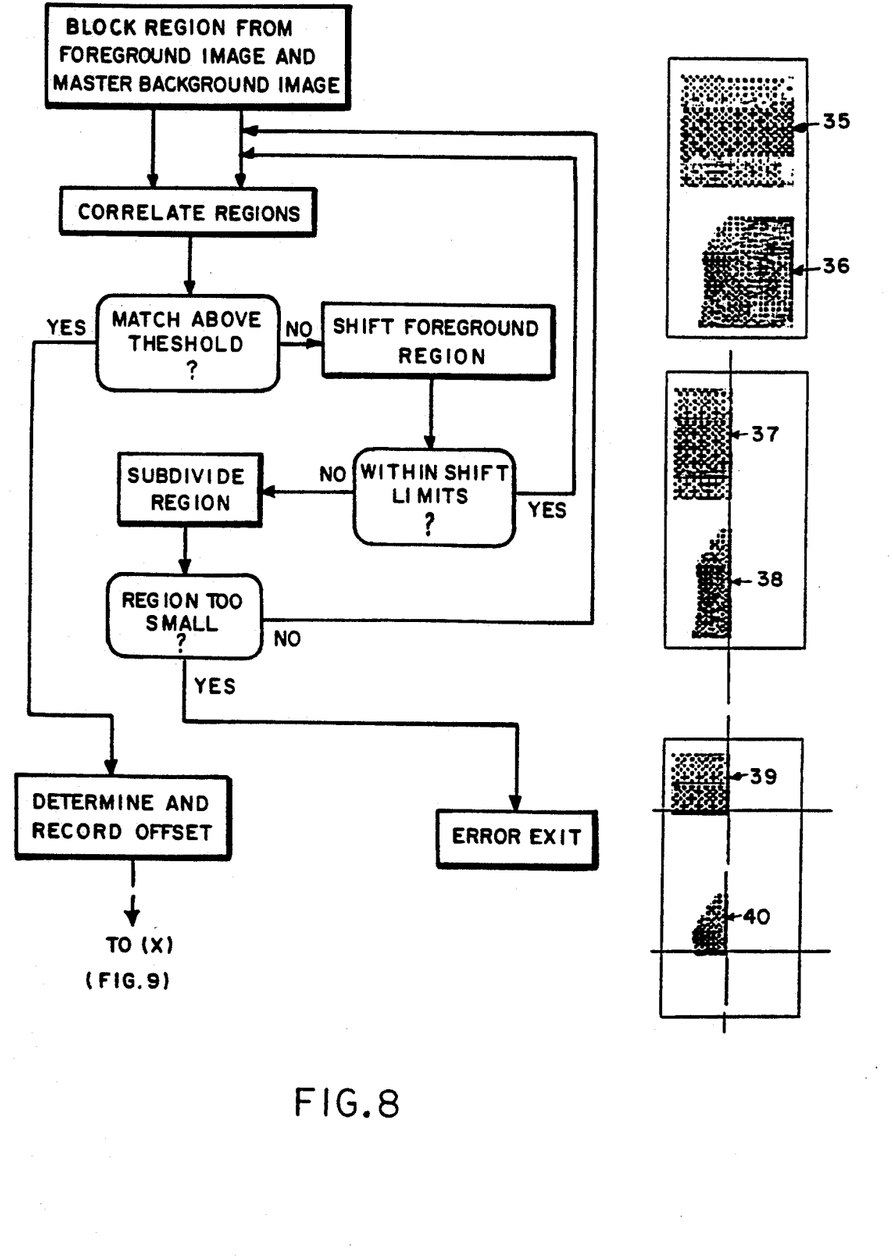
FIG. 8 shows a flow chart and associated stored image blocks for depicting a still further portion of the operation of the invention.

The above process is illustrated in the flow chart shown in FIG. 8 which shows the correlation operation with respect to blocks of the master background image and blocks of a foreground image. Illustrated therein are an exemplary block 35 of the background image in the master background buffer 31 (FIG. 2) and a block 36 at an edge region of the foreground object image of a foreground frame buffer 32, which blocks are in the same general vicinity in the frames in which they are contained. Thus, background image block 35 is compared with the similarly sized foreground edge block 36. If no correlation occurs a foreground image block that is slightly shifted from the original block is obtained and a correlation operation is again performed. If no foreground image block in the vicinity of the background image block 35 is found, within some selected shift limits, the blocks are subdivided to form a smaller background image block 37 and a smaller foreground image block 38, e.g., one half their original sizes. The same correlation and shifting process, if necessary, occurs. If no correlation is found the smaller blocks are further subdivided into corresponding still smaller blocks 39 and 40, respectively, until a match is found, within a selected threshold, as in the example illustrated. If the blocks do not correlate even at a relatively small size, the correlation process for those regions below a selected size that is too small cannot be successfully completed and an error exit from the process occurs so that a new correlation process can be started for two new blocks in corresponding regions of the background image and an edge of the foreground object image.

When a correlation, or match, occurs between the blocks of the regions involved, the offset (shift) thereof between the blocks is determined and recorded. The above matching process is shown more specifically with respect to the flow chart of FIG. 9 with reference to a block region 42 in the widened composite background image frame 41 and a corresponding region 44 in a foreground object image frame 43. When the matching is achieved for all of the blocks 45 which surround the edge of the foreground object image, the transformation parameters, i.e., the shifts representing the offsets of the correlated background and foreground image blocks relative to each other, which offsets have been recorded or stored, are used to "warp" the foreground image so as to fit it more exactly into the background image, that is, to move the edges of the foreground offset image from their original position in the foreground image frame 43 to a shifted position, as illustrated by shifted foreground image 46. The shifted, or warped, foreground object image is then composited with the background image to place the foreground image in its warped or shifted position in a frame containing a reproduction of the background image so a to produce a reconstructed widened composite image frame 47, wherein the "warped" foreground object is suitably fitted into a reproduction of the single combined background image, for storage in widened composite frame store 33 (FIG. 2).

Thus, in accordance with the re-assembly process, the single combined background image need be coded and transmitted once and it can then be stored in master background buffer 31 and re-used with each of the foreground object image frames stored in foreground frame buffers 32 of the overall set thereof in a particular scene, thereby saving the bandwidth required to re-transmit the same background image each time a foreground object image frame is transmitted. When the background image is not precisely geometrically accurate so that the foreground image cannot be exactly positioned therein, or when the foreground image is from another scene, which is visually similar and cannot be precisely positioned therein, a geometric alteration (warping) of the foreground object image may then be required, as discussed above, to produce a reasonably accurate composite of the foreground object in a frame thereof with the single background image representing a copy for that frame of the master background image.

When each of the foreground object images in each foreground image frame is appropriately positioned in a reproduction of the single master background image, that composited frame is completed and stored in composite frames store 33. The same process is repeated for each frame of the scene, so as to recreate the entire scene in the desired widened screen format. The same process is repeated for each scene of the overall program until a set of all frames of the entire program are re-created in the desired widened screen format for storage in widened composite frames store 33 (FIG. 2) and subsequent use in replaying the program.

Figure 9:
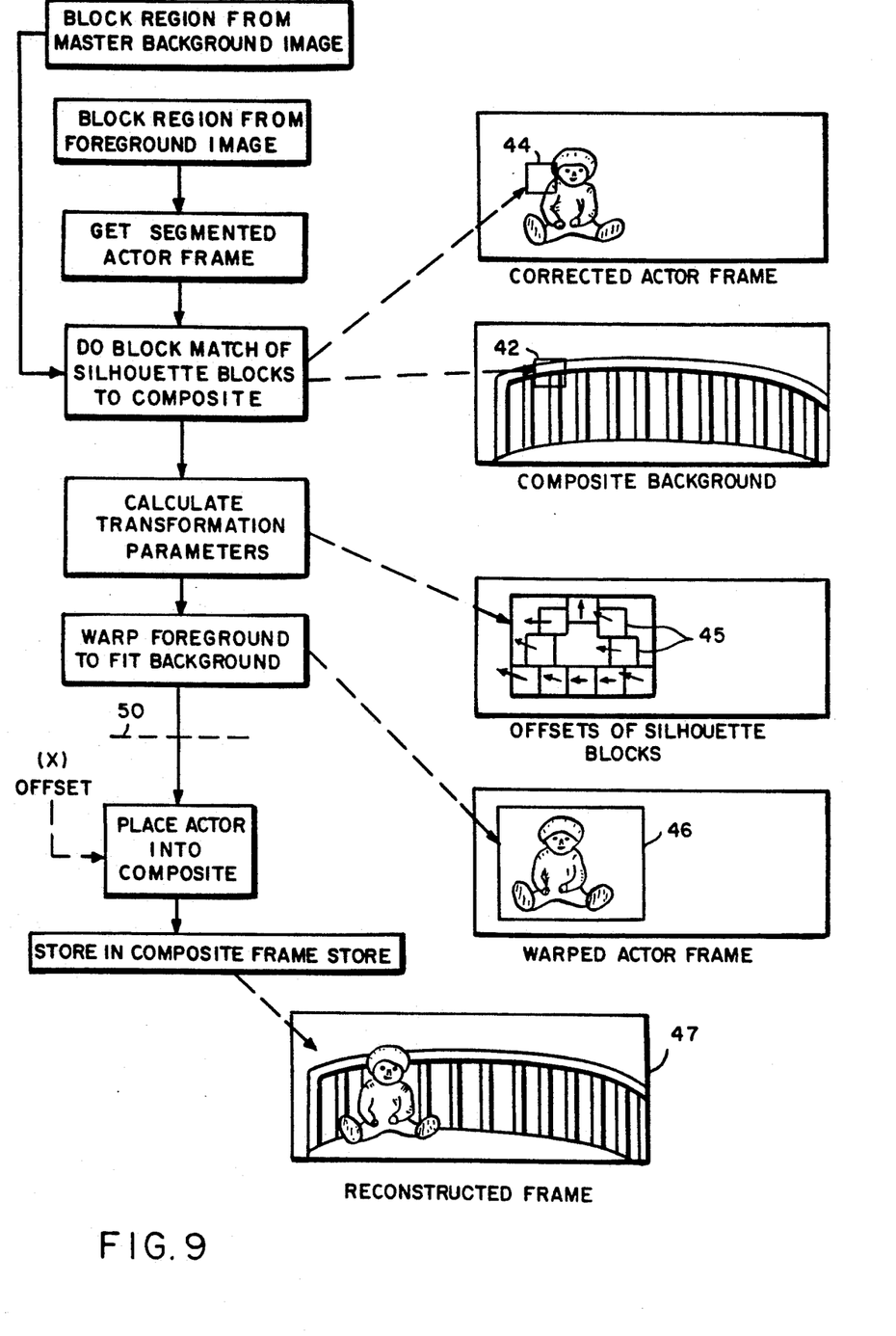
FIG. 9 shows a flow chart and associated stored images or depicting a still further portion of the operation of the invention.

In the embodiment discussed above, data representing a combined master background image of a particular scene and data representing each of the moving objects in a particular frame of the scene are transmitted separately and then re-assembled at a receiver to form each composite frame of the scene. As seen by the above description thereof, the re-assembling process requires extensive data handling and calculation techniques at the reciever. It may be desirable to simplify the operation of a receiver so that the complexity of the implementation of the receiver is considerably reduced. In such a case, the re-assembly can take place at the transmitter. That is, the compositing of the master background image for each scene and the moving objects in each frame thereof, as illustrated in FIGS. 8 and 9, up to the point depicted by dashed line 50 in FIG. 9 can be performed by the transmitter. The transmitter then need only transmit the background image data, the warped foreground object image data, and information which defines the position of the warped object image in the background image, i.e., the offset data information (FIG. 8) to the receiver. The receiver need only position the moving object image in the background image using such positional, or offset, information to form each composite frame image so that the implementation of the receiver is considerably simplified and the receiver can be manufactured more inexpensively so that its cost is reduced, although the implementation of the transmitter is made more complex. Such a situation may be desirable, however, where a single transmitter is used to supply data to a large number of different receivers.

While the above description of the invention discloses preferred embodiments thereof, modifications thereto may occur to those in the art within the spirit and scope of the invention. Hence, the invention is not to be construed as limited only to the specific embodiments as disclosed, except as defined by the appended claims.

APPENDIX

It is desirable to provide an effective optical representation of the input image frames in the scenes which are to be mapped into the widened frame format so as to eliminate distortion in this processing thereof. In this connection, it is helpful to introduce a model of the optics involved. If it is assumed that the distance to the scene is significantly greater than the focal length of the lens and that lens distortions are not significant, then a pinhole camera is a suitable model which can be used to simplify the calculations needed.

Figure 10:
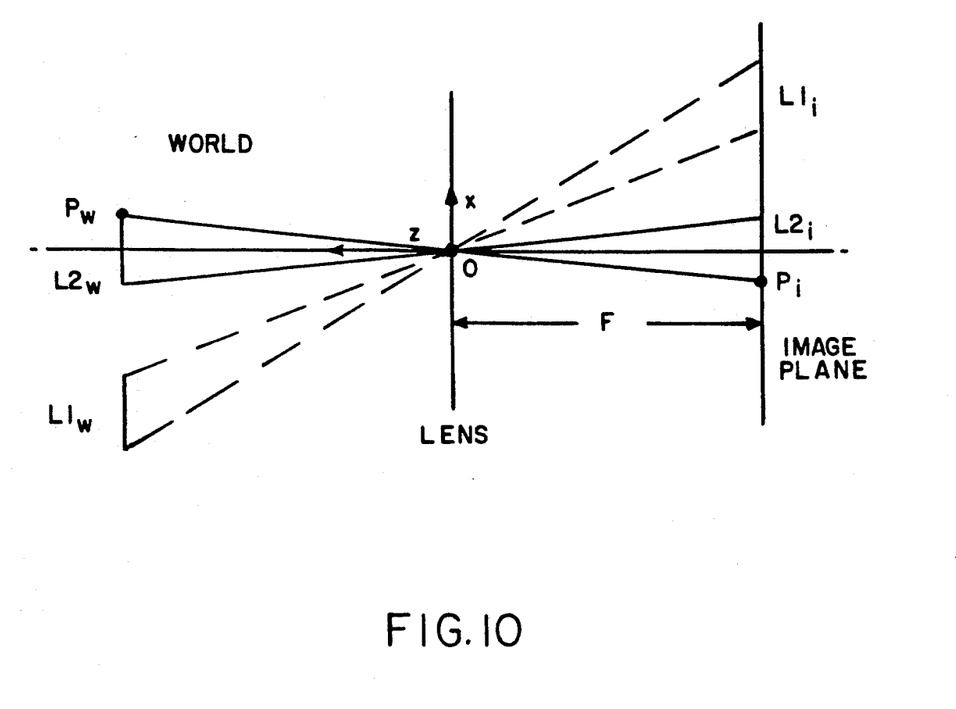
FIG. 10 shows a graph depicting an optical representation helpful in understanding the calculations needed to convert image data from rectangular to cylindrical coordinates.

FIG. 10 depicts a Cartesian space with the origin O at the focal centre of the lens (the pinhole), the optical axis of which is collinear with the z axis. Exemplary light rays can be viewed as coming from a point $P_w$, at coordinates ($x_w$, $y_w$, $z_w$), and passing through the pinhole O to be imaged at an image plane at $P_i$ ($x_i$, $y_i$, $-F$) (the image plane has a $z_i$ coordinate of $-F$, the focal length of the lens). In the diagram of FIG. 10 this has been simplified into two dimensions, with the y dimension being directed out of the page. The difference in lens focal length is reflected in the model as a difference in the distance from the lens centre to the image plane. A point $P_w$ will then be mapped onto a point $P_i$ in the image plane according to the following relationship.

$$P_i = \frac{F}{P_w \cdot z} P_w$$

It would not be acceptable merely to place different image frames from a sequence thereof side by side and combine them into one image since objects will appear differently depending on whether they are viewed in the centre of the image, on its perimeter, or some point in between. It can be seen from FIG. 10, for example, that an image $L_i$ of a line $L_w$ will have a different dimension depending on its position relative to the optical centre of the lens (i.e., depending on the differences in camera angle). Thus, although the lines $L1_w$ and $L2_w$ are in actuality of equal lengths, because the camera angles therefor are different, the image of $L1_w$, i.e., image line $L1_i$, is longer than that of $L2_w$, i.e., image line $L2_i$. It is desirable to provide an appropriate projection technique in which image dimensions are effectively independent of the camera angle.

For example, a spherical projection would be an example of a desirable projection technique and represents what would occur if a pinhole camera were to have a sphere (or, more specifically, a hemisphere) as its image plane. A simplification of a spherical projection technique, which is suitable in cases where the camera only pans horizontally, is a cylindrical projection technique with the axis of the cylinder being vertical (i.e., along the y-axis). Such a projection can be chosen for the image representation to be used for the widened scene technique of the invention. Using a cylindrical projection makes it possible to combine elements from different frames with effectively little or no distortion and provides a reference projection from which all views can be rendered. In order to map from the planar projection of the image in a frame to an objective cylindrical projection, it is necessary to perform a forward transformation when producing the widened frames and an inverse transformation back to a planner projection when later displaying such frames. This nature of such a transformation can be best understood by analyzing the geometry of the situation as depicted in FIG. 11.

In effect, two transformations occur, one in the height of a feature in the image and one in the width thereof. The height of a feature in the image is proportional to the distance from the image plane to the centre of the lens. Such relationship provides the following equations for changes in height:

$$h_c = h_f \frac{r_c}{r_f}$$

$$r_f = r_c \cos(\theta)$$

$$h_c = h_f \frac{r_c}{r_c \cos(\theta)} = h_f \frac{1}{\cos(\theta)}$$

Here $h_c$ and $h_f$ represent the height of a feature as it appears in the cylindrical and flat (planner) projections, respectively, where $r_{cl}$ and $r_{fl}$ and $\theta$ are defined in FIG. 11. The width of features is proportional to their distance along the arc of the image plane expressed as follows:

$$w_c = w_f \frac{IP_c}{IP_f}$$

$$IP_c = r_c \theta$$
$$IP_f = r_c \tan(\theta)$$

$$w_c = w_f \frac{r_c(\theta)}{r_c \tan(\theta)} = w_f \frac{1}{\tan(\theta)}$$

Here, $w_c$ and $w_f$ represent the horizontal position of a point in cylindrical and planar projections, respectively, with $IP_c$ and $IP_f$ being defined in FIG. 11.

The above equations can be readily implemented by those in the art in the control processor 10 of the system to convert the data representing images in a flat plane of an image frame to data representing images in a cylindrical plane as required in the process depicted in FIG. 3.

What is claimed is:

1. A method for processing video data in a plurality of different sequences of frames thereof, each frame in a particular sequence of frames including relatively motionless background data representing at least a part of the entire relatively motionless background data in said sequence and moving object data representing moving objects in said sequence, said method comprising the steps of storing the background and moving object data in each frame of a particular sequence of frames;

aligning common portions of the stored background data in each frame to provide stored combined background data which represents a composite relatively motionless background image which contains substantially the entire relatively motionless background data in said sequence and is at least as wide as the background image in any one frame of said sequence thereof;

processing the aligned background data to remove the moving object data therefrom;

storing said processed background data as combined background data representing said composite background image.

2. A method in accordance with claim 1 and further including the steps of processing the data in each frame of said sequence of frames to provide moving object data representing objects in each frame of said sequence of frames, which move relative to the relatively motionless background data over said sequence of frames, together with data representing selected portions of the background data which at least partially surround each moving object in each said frame.

3. A method in accordance with claim 2 and further including the steps of matching the selected portions of said background data which at least partially surround the object data representing the moving objects in each frame with corresponding portions of the combined background data to determine the correct position of said moving objects in each frame in said combined background data; and compositing said matching portions of the background at least partially surrounding said moving objects into the combined background data in each frame in accordance with said correct position determination so as to form composited image data for each frame of said sequence of frames in which said moving objects are correctly positioned in said combined background data in each frame of said sequence of frames.

4. A method in accordance with claim 3 and further including the steps of transmitting said combined background data representing said composite background image to a receiver for use in displaying said composite background image in each frame of said sequence of frames whereby each displayed frame includes at least a portion of substantially the same composite background image;

transmitting said moving object data and the portions of background data at least partially surrounding said moving object data to a receiver for use in displaying in each frame of said sequence thereof the moving object data for each said frame composited into the combined background data for each frame;

receiving at said receiver the transmitted combined background data and the transmitted moving object data with said portions of at least partially surrounding background data; and performing said matching step and said compositing step at said receiver.

5. A method in accordance with claim 3 wherein said matching step is performed at a transmitter and further includes the steps of transmitting said combined background data representing said composite background image, said moving object data with the portions of background data at least partially surrounding said moving object data, and information representing said determined correct position of said moving object in said combined background data for each frame of said sequence of frames to a receiver;

receiving at said receiver said combined background data, said moving object data with said at least partially surrounding background data, and said correct position information; and performing said compositing step at said receiver.

6. A method in accordance with claim 1 wherein said aligning step includes storing said background data in each frame in a buffer so that common portions thereof are aligned when background data in a frame is shifted relative to background data in a previous frame;

combining the stored background data in all of the aligned frames in a manner so as to produce combined background data representing the substantially entire background data in said sequence of frames.

7. A method in accordance with claim 6 and further including comparing background data in one frame relative to background data in a previous frame, and when the shift of the background data in said one frame is above a selected threshold, storing the background data in said one frame in said buffer with an offset from said previous frame representing said shift.

8. A method in accordance with claim 7 wherein, in said storing step, the background data in each frame is stored in a single widened buffer so that the background data in a frame which is shifted from the background data in a previous frame is stored in said widened buffer at a selected offset position therein, portions of said buffer at each frame containing no data.

9. A method in accordance with claim 7 wherein, in said storing step, background data is stored in a narrow buffer so that the background data in a frame which is shifted from background data in a previous frame is stored in said narrow buffer, there being no portions of said narrow buffer at each frame not containing said data, and further storing a coded number representing the offset of the data in each frame.

10. A method in accordance with claim 1 wherein said processing step includes removing pixels representing moving object data in each frame of said sequence of frames and storing said removed pixels in a moving object buffer to provide a sequence of stored frames containing only the moving objects in each frame of said sequence;

storing the relatively motionless background data remaining when said moving object data is removed in each frame in a single widened composite background buffer, said stored relatively motionless background data representing substantially the entire background data in said sequence of frames.

11. A method in accordance with claim 3 wherein the number of frames in which said moving object data is composited into the combined background data depends on how often the moving object moves over said sequence of frames.

12. A method in accordance with claim 11 wherein the moving object data for objects which move relatively often over said sequence of frames are composited into said combined background data more frequently than the moving object data for objects which move relatively less often.

13. A method in accordance with claim 4 wherein the combined background data are transmitted once for a sequence of frames, moving object data for objects which move relatively often over the sequence of frames are transmitted relatively frequently for the sequence of frames, and moving object data for objects which move less often over the sequence of frames are transmitted less frequently for the sequence of frames.

14. A method in accordance with claim 13 wherein moving object data for objects which move the most frequently over the sequence of frames are transmitted at each frame of the sequence and moving object data for objects which do not move the most frequently over the sequence of frames are transmitted more than once but less frequently than at each frame.

* * * * *